US010697590B2

(12) United States Patent
Kanezaki

(10) Patent No.: US 10,697,590 B2
(45) Date of Patent: Jun. 30, 2020

(54) HIGH PRESSURE TANK

(71) Applicant: HONDA MOTOR CO., LTD., Minato-ku, Tokyo (JP)

(72) Inventor: Toshihiko Kanezaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 128 days.

(21) Appl. No.: 15/920,581

(22) Filed: Mar. 14, 2018

(65) Prior Publication Data

US 2018/0266631 A1 Sep. 20, 2018

(30) Foreign Application Priority Data

Mar. 17, 2017 (JP) .................... 2017-053085

(51) Int. Cl.
    *F17C 13/06* (2006.01)
    *F17C 1/02* (2006.01)
    *F17C 1/16* (2006.01)

(52) U.S. Cl.
    CPC ............. *F17C 13/06* (2013.01); *F17C 1/02* (2013.01); *F17C 1/16* (2013.01); *F17C 2201/0109* (2013.01); *F17C 2203/012* (2013.01); *F17C 2203/0604* (2013.01); *F17C 2203/0619* (2013.01); *F17C 2203/0658* (2013.01); *F17C 2203/0663* (2013.01); *F17C 2205/0305* (2013.01); *F17C 2209/234* (2013.01); *F17C 2221/012* (2013.01); *F17C 2270/0184* (2013.01); *Y02E 60/321* (2013.01)

(58) Field of Classification Search
    CPC .. F17C 13/06; F17C 1/02; F17C 13/02; F17C 2205/0305; F16J 15/062; F16J 12/00
    USPC .......... 220/587, 588, 589, 590, 591
    See application file for complete search history.

(56) References Cited

U.S. PATENT DOCUMENTS 3,137,405 A * 6/1964 Gorcey .................. F17C 1/10
                                                    220/590
2011/0240655 A1* 10/2011 Lindner .................. F16J 12/00
                                                    220/589

FOREIGN PATENT DOCUMENTS

| JP | 11-210988 | 8/1999 |
| JP | 2016-183687 | 10/2016 |

OTHER PUBLICATIONS

Chinese Office Action for Chinese Patent Application No. 201810219322.3 dated Sep. 4, 2019.

* cited by examiner

*Primary Examiner* — Jeffrey R Allen
(74) *Attorney, Agent, or Firm* — Amin, Turocy & Watson, LLP

(57) ABSTRACT

A high pressure tank includes: a resin liner for containing a fluid; a reinforced layer covering an outer surface of the liner; and a cap including a supply/discharge hole for supplying and discharging the fluid to and from the liner. Gas vent passages formed in the cap each including at one end a first opening open toward the cap-facing surface of the liner and at the other end a second opening open toward at least one of an inside of the supply/discharge hole and an outside of the reinforced layer. A cross-sectional area of the gas vent passage at the one end perpendicular to a longitudinal direction and the first opening are smaller than other cross-sectional areas of the gas vent passage perpendicular to the longitudinal direction.

8 Claims, 6 Drawing Sheets

HIGH PRESSURE TANK

CROSS-REFERENCE TO RELATED APPLICATION

This application is based upon and claims the benefit of priority from Japanese Patent Application No. 2017-053085 filed on Mar. 17, 2017, the contents of which are incorporated herein by reference.

BACKGROUND OF THE INVENTION

Field of the Invention

The present invention relates to a high pressure tank that includes a liner that can contain a fluid inside and is made of resin, a reinforced layer that covers an outer surface of the liner, and a cap that includes a supply/discharge hole that is formed to supply and discharge the fluid to and from an interior of the liner.

Description of the Related Art

High pressure tanks are widely used as containers that contain fluids such as gases and liquids. For example, a high pressure tank is mounted on a fuel cell vehicle as a container for a hydrogen gas to be supplied to a fuel cell system.

A high pressure tank of this type is known to include a liner that can contain a fluid inside and is made of resin, a reinforced layer that covers an outer surface of the liner and is made of fiber-reinforced plastics, and a cap that includes a supply/discharge hole that is formed therein to supply and discharge a fluid to and from an interior of the liner. This supply/discharge hole is provided with, for example, a valve. By operating the valve, it is possible to supply the fluid to the interior of the liner and discharge the fluid contained inside the liner via the supply/discharge hole.

By the way, the resin liner tends to readily allow the fluid to permeate compared to a liner made of metal such as aluminum. Therefore, as being filled with the fluid, the interior of the liner is highly pressurized, so that the fluid in the interior permeates through the liner, and tends to be retained at a portion between the outer surface of the liner and the reinforced layer (also referred to as a covered portion below). Then, the fluid inside the liner is discharged in a state where the fluid is retained at the covered portion in this way, the interior has a lower pressure than the covered portion. As a result, it is concerned that the liner may be partially separated from the reinforced layer or further expanded toward the interior of the liner, i.e., so-called buckling occurs, and durability of the liner may be lowered.

To prevent the retention of the fluid at the covered portion and improve the durability of the liner, a release path communicating the covered portion and an outside of the reinforced layer may be formed in a cap. That is, a first opening at one end of the release path is formed on a surface of the cap in contact with an outer surface of the liner (referred to as a contact surface below), and a second opening at the other end of the release path is formed on another surface of the cap facing outside the reinforced layer (referred to as an open surface below). The fluid at the covered portion is guided from the first opening into the release path, and the guided fluid is released outside the reinforced layer via the second opening. Therefore, a cross-sectional area perpendicular to a longitudinal direction of the release path (also simply referred to as a cross-sectional area below), and areas of the first opening and the second opening are set to sufficiently allow the fluid to pass therethrough.

However, in a case where the release path is formed as described above, when the interior of the liner is highly pressurized, a peripheral corner portion of the first opening is pressed against the liner, having the liner suffer from stress concentration. As a result, improvement of the durability of the liner may not be achieved.

To address this issue, for example, Japanese Laid-Open Patent Publication No. 11-210988 proposes making a cross-sectional area at one end of the release path and an area of the first opening larger than the other portion of the release path, and arranging a porous sheet that can allow a fluid to permeate at these enlarged cross-sectional portions. That is, the fluid is enabled to be guided to the release path via the porous sheet so that the fluid is prevented from retaining at the covered portion. Further, the porous sheet is arranged to be flush with the periphery of the first opening of a contact surface inside the enlarged portion, so that the contact surface is brought into contact with the outer surface of the liner along with the porous sheet, avoiding the above-mentioned stress concentration.

SUMMARY OF THE INVENTION

In a high pressure tank of this type, the interior of the liner is highly pressurized at more than 100 MPa, for example. In this case, as described above, a significantly high load is applied to the porous sheet interposed between the outer surface of the liner and the cap. It is not easy to make the porous sheet that can withstand the load while keeping porosity.

As a fluid is supplied and discharged to and from the interior of the liner, the fluid is compressed and expanded. Therefore, a temperature of the high pressure tank changes in a wide range from high to low. In a case where materials that constitute the porous sheet and the cap have different linear expansion coefficients, a thermal stress caused by the changes in temperature also needs to be considered. However, with the porous sheet interposed at the enlarged cross-sectional portion of the release path, it is difficult to design a high pressure tank that can prevent both the retention of the fluid at the covered portion and the above-mentioned stress concentration for a long period of time.

A main object of the present invention is to provide a high pressure tank that can prevent a fluid from retaining between an outer surface of a liner and a reinforced layer, and effectively improve durability of the liner by a simple configuration.

One embodiment of the present invention is a high pressure tank that includes: a resin liner configured to contain a fluid; a reinforced layer covering an outer surface of the liner; and a cap including a supply/discharge hole configured to supply and discharge the fluid to and from the liner, wherein the outer surface of the liner includes a reinforced-layer-facing surface facing toward the reinforced layer, and a cap-facing surface facing toward the cap; a gas vent passage is formed in the cap, and includes at one end a first opening facing toward the cap-facing surface and at the other end a second opening facing toward at least one of an inside of the supply/discharge hole and an outside of the reinforced layer; and a cross-sectional area of the gas vent passage at one end perpendicular to its longitudinal direction and an area of the first opening are smaller than a cross-sectional area of the gas vent passage at another portion perpendicular to the longitudinal direction.

In this high pressure tank, the cross-sectional area perpendicular to the longitudinal direction at the one end of the gas vent passage (also simply referred to as a cross-sectional area below), and the area of the first opening are smaller than the cross-sectional areas of the other portions of the gas vent passage. By making the area of the first opening small, even when a pressure is applied to the liner in a direction to press the liner toward the first opening, it is possible to reduce a shear stress generated at the portion of the liner facing toward the first opening. As a result, it is possible to prevent stress concentration and a creep at the facing portion and surroundings of the liner.

On the other hand, the cross-sectional area of the other portion of the gas vent passage is made lager than the area of the first opening to let the fluid flow through the gas vent passage smoothly. Consequently, it is possible to effectively guide the fluid between the reinforced layer and the reinforced-layer-facing surface into the supply/discharge hole or outside the reinforced layer. Consequently, it is possible to prevent buckling of the liner.

As described above, a simple configuration of this high pressure tank where the area of the first opening of the gas vent passage is made smaller than the cross-sectional area of the other portion can prevent the liner from suffering from stress concentration and creep, and the fluid from being retained between the outer surface of the liner and the reinforced layer. As a result, it is possible to effectively improve durability of the liner.

In the high pressure tank, the area of the first opening is preferably set such that a maximum shear stress generated at the portion of the liner facing toward the first opening is equal to or less than ½ of a yield stress S of the resin material constituting the liner. The yield stress S of the resin material described herein is a reference stress at which the resin material is plastically deformed, and basically refers to an elastic limit. However, the yield stress S may be 0.2% offset when it is difficult to measure the elastic limit.

In view of a maximum shear stress theory (Tresca theory), when the maximum shear stress generated in the liner reaches the yield strength (yield stress S) of the resin material that constitutes the liner, creep is likely to occur. Hence, by setting the area of the first opening such that the maximum sheer stress generated at the facing portion of the liner is equal to or less than ½ of the yield stress S of the resin material, it is possible to more effectively prevent creep from being generated in the liner.

In the high pressure tank, in a case where a shape of the first opening is circular, a diameter D of the first opening, a thickness T of the facing portion, and a maximum filling pressure P of the fluid and the yield stress S preferably satisfy a relationship of D<S×T×2/P. The shear stress generated at the facing portion can be calculated by dividing a shear load by a cross-sectional area parallel to the shear load. That is, in the case of a circular first opening, the maximum shear stress τC generated at the facing portion can be calculated by the following equation.

$$\tau C = (P \times \pi \times D^2 / 4) / \pi \times D \times T = (D \times P) / (4 \times T)$$

Hence, when the relationship of D<S×T×2/P holds, the maximum shear stress τC can be equal to or less than ½ of the yield stress S of the resin material (τC<½S). Consequently, it is possible to more effectively prevent creep from being formed in the liner as described above.

The high pressure tank may further include a plug inserted in an insertion hole formed in the cap to open toward the cap-facing surface, and at least part of a plug passage penetrating the plug may form the one end of the gas vent passage, and a cap passage formed in the cap may form the other end of the gas vent passage, and the first opening may be formed in an end surface of one end of the plug facing toward the cap-facing surface.

The one end of the gas vent passage has the cross-sectional area that needs to be made smaller than the other portion of the gas vent passage, and therefore is difficult to be formed. Even such one end of the gas vent passage can be easily formed by using the plug. That is, the plug can be formed separately from the cap. Moreover, the plug only needs to have a shape that is insertable in the insertion hole of the cap, and therefore can be of an easy and simple shape. The plug passage can also be easily formed to penetrate through this plug. Consequently, it is possible to make the cross-sectional area of the entire plug passage small or form a portion of a small cross-sectional area at one end of the plug passage. By inserting the plug with the plug passage formed therein in the insertion hole that communicates with the cap passage, it is possible to easily form the gas vent passage formed by the cap passage and the plug passage.

The high pressure tank may further include a plug inserted in an insertion hole formed in the cap to open toward the cap-facing surface, and at least part of a groove passage formed on a surface of the plug may form the one end of the gas vent passage, and a cap passage formed in the cap may form the other end of the gas vent passage, and the first opening may be formed in an end surface on one end of the plug facing toward the cap-facing surface. In this case, the groove passage can also be easily formed in the plug. Consequently, it is possible to easily form the gas vent passage having a small cross-sectional area on the one end.

In the high pressure tank, the plug is preferably made of the material same as the material of the cap. In this case, the cap and the plug can have the same linear expansion coefficient. Thus, it is possible to prevent a thermal stress between the cap and the plug. That is, it is possible to suitably prevent the fluid from retaining between the outer surface of the liner and the reinforced layer for a long period of time, and more effectively improve the durability of the high pressure tank.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A preferred embodiment of a high pressure tank according to the present invention will be described in detail below with reference to the accompanying drawings.

The high pressure tank according to the present invention is mounted on, for example, a fuel cell vehicle, and is suitably used to contain a hydrogen gas to be supplied to a fuel cell system. The present embodiment will describe an example where the high pressure tank contains a hydrogen gas as a fluid to be supplied to the fuel cell system, yet is not limited to this in particular. The high pressure tank according to the present invention can contain fluid other than the hydrogen gas.

Figure 1:
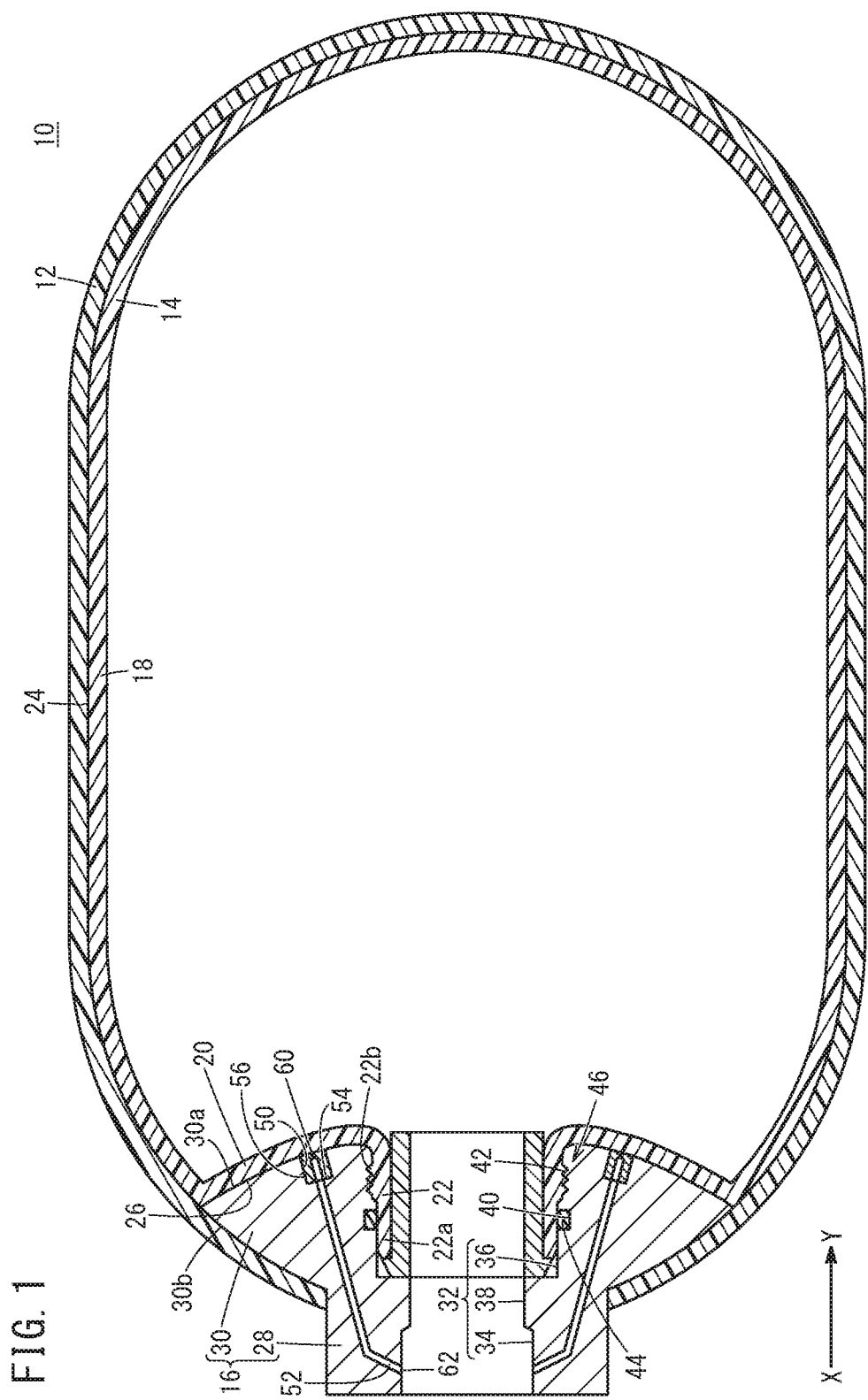
FIG. 1 is a schematic cross-sectional view of a high pressure tank according to an embodiment of the present invention along an axial direction of a cylindrical portion of the high pressure tank.

As shown in FIG. 1, a high pressure tank 10 according to the present embodiment mainly includes a reinforced layer 12, a liner 14 and a cap 16. The reinforced layer 12 is made of fiber-reinforced plastics, and covers an outer surface of the liner 14.

The liner 14 is a hollow body made of resin, and can contain a hydrogen gas inside. More specifically, the liner 14 includes a main body portion 18 having an outer surface covered by the reinforced layer 12, a dented portion 20 that is bent inward of the main body portion 18, and a cylindrical portion 22 that protrudes outward of the main body portion 18 from the dented portion 20. That is, an outer surface of the main body portion 18 of the outer surface of the liner 14 is a reinforced-layer-facing surface 24 that faces toward the reinforced layer 12. Outer surfaces of the dented portion 20 and the cylindrical portion 22 are a cap-facing surface 26 that faces toward the cap 16 as described below.

A thin portion 22a is formed on a protrusion end (distal end) side of the cylindrical portion 22. A male screw 22b is formed on a side closer to a proximal end than the thin portion 22a of the cylindrical portion 22. The thin portion 22a is a portion thinner than the other portions. The thickness of the thin portion 22a is preferably 1 mm or more to provide sufficient rigidity.

As shown in FIG. 1, a cap 16 is fitted onto the cylindrical portion 22. The cap 16 is made of metal, for example, and has a protrusion portion 28 of a cylindrical shape and a shoulder portion 30 that extends radially outward from the proximal end of the protrusion portion 28. A supply/discharge hole 32 is formed, penetrating along an axial direction of the protrusion portion 28.

An end surface 30a of the shoulder portion 30 on a side opposite to the protrusion portion 28 (an arrow direction Y side in FIG. 1) is in contact with an outer surface of the dented portion 20 of the liner. A circumferential surface 30b of the shoulder portion 30 on a side of the protrusion portion 28 (an arrow direction X side in FIG. 1) is covered by the reinforced layer 12 together with the liner 14. That is, the cap 16 has a shape that the shoulder portion 30 is covered together with the liner 14 by the reinforced layer 12 and the protrusion portion 28 is exposed and protrudes through an opening of the reinforced layer 12.

An outer diameter of the protrusion portion 28 is substantially constant. On the other hand, an inner diameter of the protrusion portion 28, i.e., a diameter of the supply/discharge hole 32 varies by location. More specifically, the supply/discharge hole 32 includes a medium inner diameter hole 34 located on the side of the protrusion portion 28 in the axial direction, a large inner diameter hole 36 located on a side of the shoulder portion 30, and a small inner diameter hole 38 formed between the medium inner diameter hole 34 and the large inner diameter hole 36.

The cylindrical portion 22 is inserted in the large inner diameter hole 36. Thus, an outer circumferential surface of the cylindrical portion 22 is disposed along an inner circumferential surface of the large inner diameter hole 36. That is, it is possible to supply the hydrogen gas from the medium inner diameter hole 34 and the small inner diameter hole 38 of the supply/discharge hole 32 to the liner 14 via the interior of the cylindrical portion 22. Further, it is possible to discharge the hydrogen gas inside the liner 14 via the interior of the cylindrical portion 22 and the small inner diameter hole 38 and the medium inner diameter hole 34 of the supply/discharge hole 32.

Hence, a direction from the distal end side to the proximal end side of the cylindrical portion 22 is a supply direction (the arrow direction in FIG. 1) of the hydrogen gas for the liner 14. In other words, the direction from the proximal end side to the distal end side of the cylindrical portion 22 is a discharge direction of the hydrogen gas contained in the liner 14.

An inner diameter of the large inner diameter hole 36 is set to a size matching an outer diameter of the cylindrical portion 22. More specifically, an inner diameter of a portion of the large inner diameter hole 36 facing toward the thin portion 22a is smaller than an inner diameter of a portion on a side closer to the proximal end than the thin portion 22a. An inner wall of the large inner diameter hole 36 includes, at a portion facing toward the thin portion 22a of the cylindrical portion 22, a seal groove 40 of an annular shape along a circumferential direction of the large inner diameter hole 36, and at a portion facing toward the male screw 22b of the cylindrical portion 22, a female screw 42 to be screwed with the male screw 22b.

Inside the seal groove 40, a seal member 44 formed by an O ring is disposed. A distance (seal gap) between an inner wall surface of the seal groove 40 and the outer circumferential surface of the thin portion 22a is set to maintain a compressed state of the seal member 44 therebetween. Thus, the outer circumferential surface of the cylindrical portion 22 and the inner circumferential surface of the supply/discharge hole 32 of the cap 16 are sealed.

At downstream of the seal groove 40 in the supply direction, the male screw 22b and the female screw 42 are screwed to form a bonding portion 46 that bonds the outer circumferential surface of the cylindrical portion 22 and the inner circumferential surface of the large inner diameter hole 36.

An insertion hole 50 and a cap passage 52 are further formed in the cap 16 and respectively have circular cross-sectional shapes. The insertion hole 50 has a predetermined length from the end surface 30a of the shoulder portion 30 to the protrusion portion 28, and communicates with one end of the cap passage 52. The insertion hole 50 has a diameter larger than that of the cap passage 52. Therefore, a step surface 54 formed between the insertion hole 50 and the cap passage 52 by a difference of their diameters. The insertion hole 50 and the cap passage 52 are formed in plural in the cap 16 at constant intervals in a circumferential direction.

Figure 3:
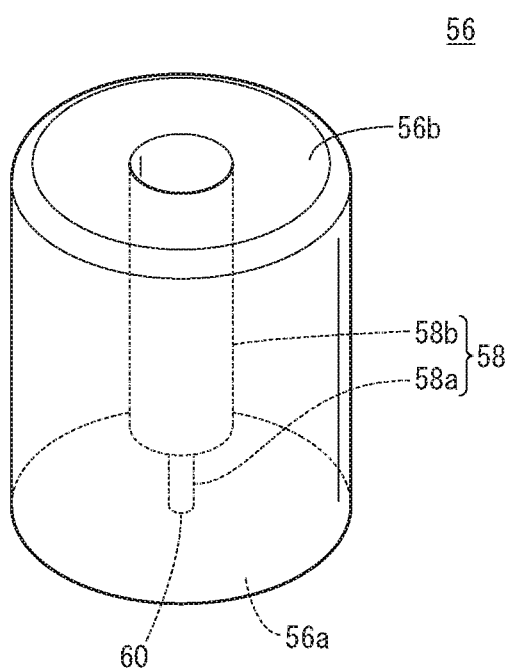
FIG. 3 is a perspective view of a plug in FIG. 1.

A plug 56 is inserted in the insertion hole 50. As shown in FIG. 3, the plug 56 is a cylindrical body formed by the same material as that of the cap 16, and includes a plug passage 58 formed therein to penetrate the plug 56 along the axial direction. The plug passage 58 includes a small diameter passage 58a formed on one end side in the axial direction of the plug 56, and a large diameter passage 58b formed on the other end side. A first opening 60 at one end of the small diameter passage 58a is formed in one end surface 56a of the plug 56. The plug 56 is inserted in the insertion hole 50 such that the one end surface 56a of this plug 56 and the end surface 30a of the shoulder portion 30 are flush with each other. That is, the first opening 60 of the small diameter passage 58a faces toward an outer surface (cap-facing surface 26) of the dented portion 20 of the liner 14.

An opening at the other end of the large diameter passage 58b is formed in another end surface 56b of the plug 56. The other end surface 56b of the plug 56 is in contact with the step surface 54.

Figure 2:
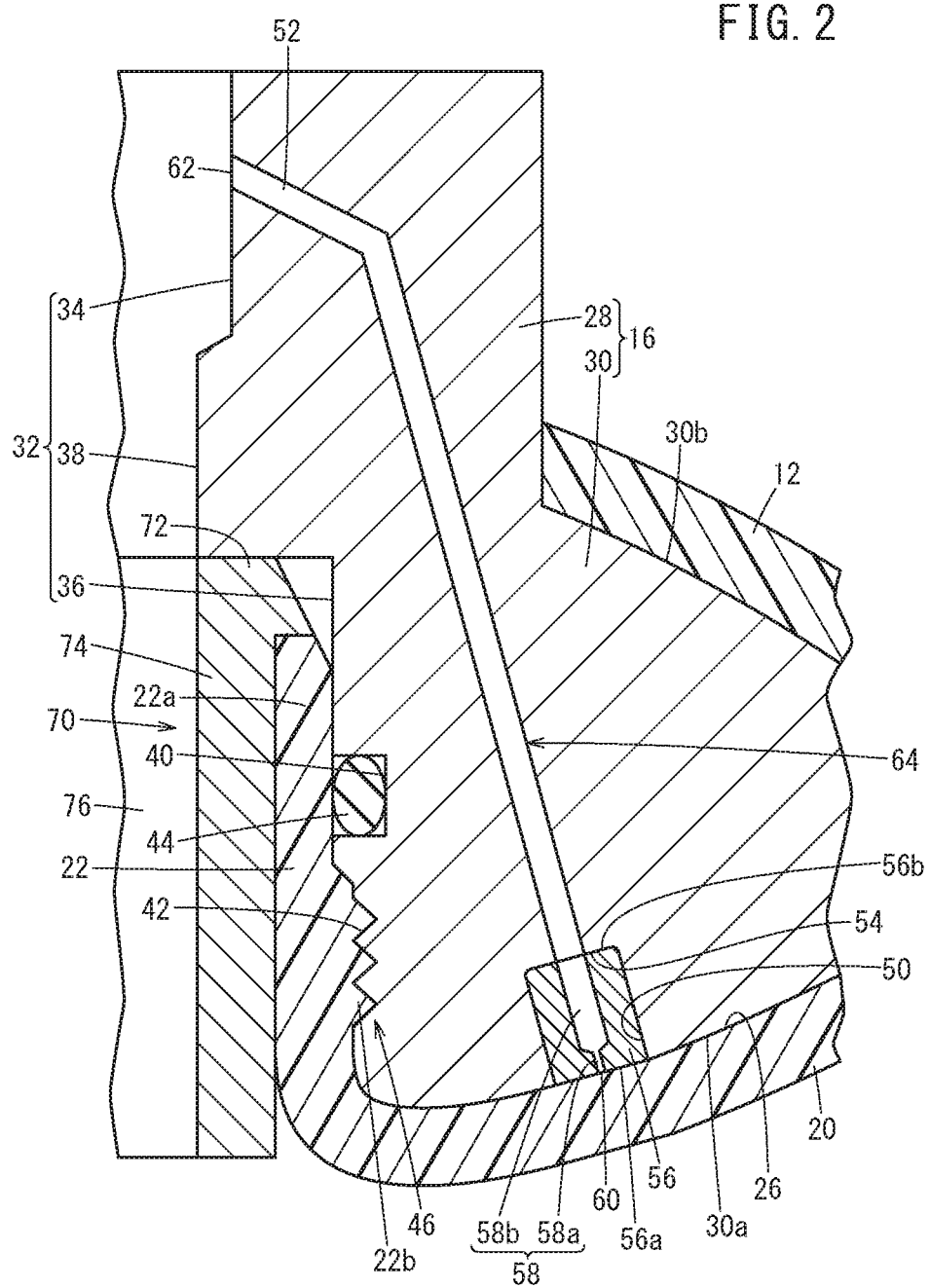
FIG. 2 is an enlarged cross-sectional view of a cap side of the high pressure tank shown in FIG. 1.

As shown in FIG. 2, the cap passage 52 has the substantially same diameter as that of the large diameter passage 58b of the plug passage 58, and has one end open toward a bottom surface of the insertion hole 50. The cap passage 52 extends through the cap 16 linearly along, for example, a first direction from the insertion hole 50 to the protrusion portion 28, and further extending linearly along a second direction toward an inner circumferential surface of the medium inner diameter hole 34 with an angle with respect to the first direction. Thus, a second opening 62 on the other end of the cap passage 52 is formed in the inner circumferential surface of the medium inner diameter hole 34.

Hence, in the present embodiment, a gas vent passage 64 includes one end open toward an outer surface of the dented portion 20 and the other end open toward the supply/discharge hole 32, and is formed by the plug passage 58 and the cap passage 52. A cross-sectional area perpendicular to a longitudinal direction of the small diameter passage 58a (also simply referred to as a cross-sectional area below) that forms the one end of the gas vent passage 64, and an area of the first opening 60 are smaller than the other portions (the large diameter passage 58b and the cap passage 52). In the present embodiment, the cross-sectional area of the small diameter passage 58a and the area of the first opening 60 are the same. The small diameter passage 58a, the large diameter passage 58b and the cap passage 52 respectively have constant cross-sectional areas along the extension direction.

More specifically, for a reason described below, the area of the first opening 60 is preferably set such that a maximum shear stress τC generated at a portion 14a of the liner 14 facing toward the first opening 60 (see FIG. 4) is equal to or less than ½ of a yield stress S of a resin material that constitutes the liner 14. In addition, the yield stress S is a reference stress at which the resin material plastically deforms, and basically refers to an elastic limit. However, when it is difficult to measure the elastic limit, the yield stress S may be 0.2% offset.

Figure 4:
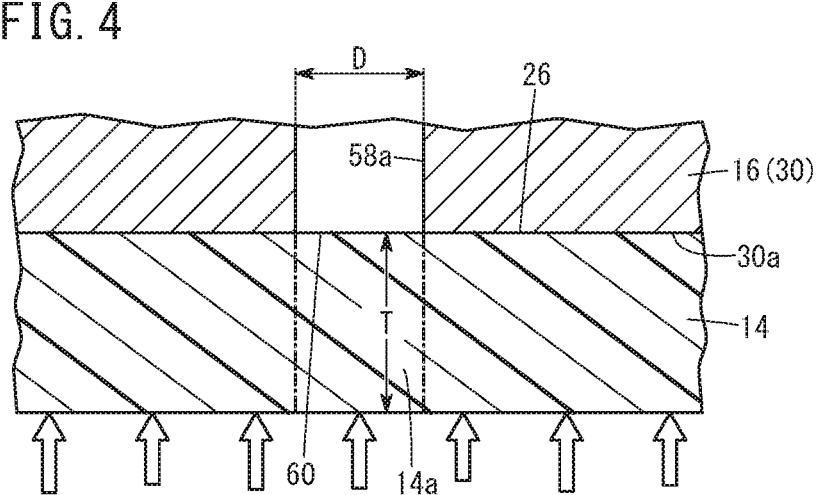
FIG. 4 is a view for explaining a shear stress generated at a portion of a liner.

That is, as shown in FIG. 4, the area of the first opening 60 is preferably set such that a diameter D of the first opening 60, a thickness T of the facing portion 14a, a maximum filling pressure P of the hydrogen gas and the yield stress S satisfy a relationship of $D<S \times T \times 2/P$.

As shown in FIG. 2, a collar 70 is further disposed inside the large inner diameter hole 36 to support the cylindrical portion 22. The collar 70 is made of metal, for example, and includes a head portion 72 of an annular shape and a cylinder portion 74 of a cylindrical shape integrally formed with the head portion 72. A passage hole 76 is formed, penetrating the collar 70 along the axial direction of the cylinder portion 74.

A circumferential surface of the head portion 72 is formed in a tapered shape whose diameter expands from one end surface on the upstream side to the other end surface on the downstream side in the supply direction. In the large inner diameter hole 36, one end surface of the head portion 72 comes into contact with a step surface formed between the small inner diameter hole 38 and the large inner diameter hole 36, and the other end surface of the head portion 72 comes into contact with a distal end surface of the cylindrical portion 22.

The cylinder portion 74 is inserted on an inner side of the cylindrical portion 22, so that the passage hole 76 communicates with the medium inner diameter hole 34 and the small inner diameter hole 38 of the supply/discharge hole 32 and the interior of the liner 14. An outer circumferential surface of the cylinder portion 74 extends along the inner circumferential surface of the large inner diameter hole 36 with the cylindrical portion 22 interposed therebetween. That is, the cylindrical portion 22 is sandwiched between the outer circumferential surface of the cylinder portion 74 and the inner circumferential surface of the large inner diameter hole 36.

From a viewpoint to sandwich the cylindrical portion 22 more suitably, the cylinder portion 74 is preferably press-fitted in the cylindrical portion 22. In this case, the cylinder portion 74 presses the cylindrical portion 22 toward the inner circumferential surface of the large inner diameter hole 36. Then, the outer circumferential surface of the cylindrical portion 22 comes into pressing contact with the inner circumferential surface of the large inner diameter hole 36. Consequently, it is easy to keep the seal gap constant.

As described above, the collar 70 employs a simple configuration including only the head portion 72 and the cylinder portion 74, and therefore can be easily attached to the large inner diameter hole 36 and the cylindrical portion 22.

The high pressure tank 10 according to the present embodiment is basically configured as described above. As described above, in this high pressure tank 10, the high pressure hose is connected with the supply/discharge hole 32 of the cap 16 with a solenoid valve interposed therebetween to supply the hydrogen gas from a hydrogen supply source (not shown) into the liner 14 via the supply/discharge hole 32 and the passage hole 76. When the hydrogen gas supplied in this way pressurizes the interior of the high pressure tank 10. In other words, when the hydrogen gas filling the liner 14 applies a high pressure, the hydrogen gas inside readily permeates the liner 14.

As described above, in this high pressure tank 10, a portion between the end surface 30a of the shoulder portion 30 and the outer surface (cap-facing surface 26) of the dented portion 20 is open to the supply/discharge hole 32 via the gas vent passages 64. Hence, when the hydrogen gas permeates the liner 14 and enters the gap between the reinforced-layer-facing surface 24 and the reinforced layer 12, the hydrogen gas readily moves toward the portion between the outer surface of the dented portion 20 and the end surface 30a of the shoulder portion 30 on a low pressure side.

The hydrogen gas between the outer surface of the dented portion 20 and the end surface 30a of the shoulder portion 30 is guided from the first openings 60 into the gas vent passages 64, and flows toward the other end side of the gas vent passages 64. Then, the hydrogen gas is released to the supply/discharge hole 32 via the second openings 62. Consequently, even when the hydrogen gas permeates the liner 14, it is possible to prevent the hydrogen gas from retaining between the reinforced-layer-facing surface 24 and the reinforced layer 12.

As described above, in this high pressure tank 10, the cross-sectional area on the one end side (small diameter passage 58a) of the gas vent passage 64 and the area of the first opening 60 are set smaller than the cross-sectional areas of the other portions (the large diameter passage 58b and the cap passage 52) of the gas vent passage 64. Consequently, even when the pressure applied by the hydrogen gas is lowered, it is possible to reduce a shear stress generated at the facing portion 14a of the liner 14. As a result, it is possible to prevent stress concentration and creep at and about the facing portion 14a of the liner 14.

In this case, the area of the first opening 60 is preferably set such that, when the filling pressure of the hydrogen gas is maximum, i.e., when the filling pressure is the maximum filling pressure P, the maximum shear stress τC generated at the facing portion 14*a* is equal to or less than ½ of the yield stress S of the resin material. In view of the maximum shear stress theory (Tresca theory) and the like, when the maximum shear stress τC reaches the strength (yield stress S) of the resin material that constitutes the liner 14, the creep is likely to occur. Hence, by setting the area of the first opening 60 to satisfy τC<½S as described above, it is possible to more effectively prevent creep from being generated in the liner 14.

The shear stress can be calculated by dividing a shear load by a cross-sectional area parallel to the shear load. Consequently, the maximum shear stress τC generated at the facing portion 14*a* can be calculated by the following equation.

$$\tau C = (P \times \pi \times D^2/4)/\pi \times D \times T = (D \times P)/(4 \times T)$$

Hence, when a relationship of D<S×T×2/P is met, τC<½S can hold. Consequently, it is possible to more effectively prevent the creep for the liner 14 as described above.

In this high pressure tank 10, the other portions (the large diameter passage 58*b* and the cap passage 52) of the gas vent passage 64 have the cross-sectional areas larger than the area of the first opening 60 to let the hydrogen gas flow smoothly through the gas vent passages 64. Consequently, it is possible to effectively guide the hydrogen gas between the reinforced layer 12 and the reinforced-layer-facing surface 24 to the supply/discharge hole 32. That is, it is possible to effectively prevent the hydrogen gas from being retained between the reinforced layer 12 and the reinforced-layer-facing surface 24.

Meanwhile, as described above, the hydrogen gas contained in the liner 14 can be discharged via an on-off valve attached to the medium inner diameter hole 34, and is supplied to a pipe connected to the fuel cell system (none of which is shown). Thus, even when the hydrogen gas is discharged and the interior of the high pressure tank 10 is depressurized, the hydrogen gas is prevented from retaining as described above, so that it is possible to prevent buckling.

As described above, in this high pressure tank 10 according to the present embodiment, the area of the first opening 60 of the gas vent passage 64 is made smaller than the cross-sectional areas of the other portions. With this simple configuration, it is possible to prevent the stress concentration and creep generation in the liner 14. Meanwhile, the hydrogen gas between the outer surface of the liner 14 and the reinforced layer 12 can be prevented from being retained. As a result, it is possible to effectively improve durability of the liner 14.

As described above, in the high pressure tank 10, the gas vent passage 64 is formed by the plug passage 58 and the cap passage 52. The one end side of the gas vent passage 64 is required to have the cross-sectional area made smaller than the other portions of the gas vent passage 64, and therefore is difficult to be formed. Even such one end of the gas vent passage 64 is formed easily by providing as the small diameter passage 58*a* of the plug passage 58.

That is, the plug 56 can be formed separately from the cap 16. Moreover, the plug 56 only needs to have a shape that is insertable in the insertion hole 50 of the cap 16, and therefore can be of an easy and simple shape. The plug passage 58 can also be easily formed to penetrate through this plug 56.

Consequently, it is possible to easily form the small diameter passage 58*a* having the small cross-sectional area at one end of the plug passage 58. By inserting the plug 56 with the plug passage 58 formed therein in the insertion hole 50 that communicates with the cap passage 52, it is possible to easily form the gas vent passage 64 formed by the cap passage 52 and the plug passage 58.

The plug 56 is preferably formed by the material same as that of the cap 16. The cap 16 and the plug 56 can have the same linear expansion coefficient. Thus, it is possible to prevent a thermal stress between the cap 16 and the plug 56. That is, it is possible to suitably prevent the fluid from retaining between the outer surface of the liner 14 and the reinforced layer 12 for a long period of time, and more effectively improve the durability of the high pressure tank 10.

The present invention is not limited to the embodiment in particular, and can be variously modified without departing from the scope of the invention.

In the high pressure tank 10 according to the embodiment, the plug 56 has the plug passage 58 formed of the small diameter passage 58*a* and the large diameter passage 58*b* having different diameters. However, the plug passage 58 may be formed only of the small diameter passage 58*a*. In this case, the entire plug passage 58 forms the one end of the gas vent passage 64 with the cross-sectional area smaller than the other portions of the gas vent passage 64.

In the high pressure tank 10 according to the embodiment, the small diameter passage 58*a*, the large diameter passage 58*b* and the cap passage 52 respectively have the constant cross-sectional areas along the extension direction, yet are not limited to these in particular. For example, the small diameter passage 58*a* may have a tapered shape having a diameter decreasing toward one end side, and have a portion with a cross-sectional area different from the area of the first opening 60. In this case, at least the area of the first opening 60 is preferably set such that the maximum shear stress generated at the facing portion 14*a* is equal to or less than ½ of the yield stress S of the resin material.

Figure 5:
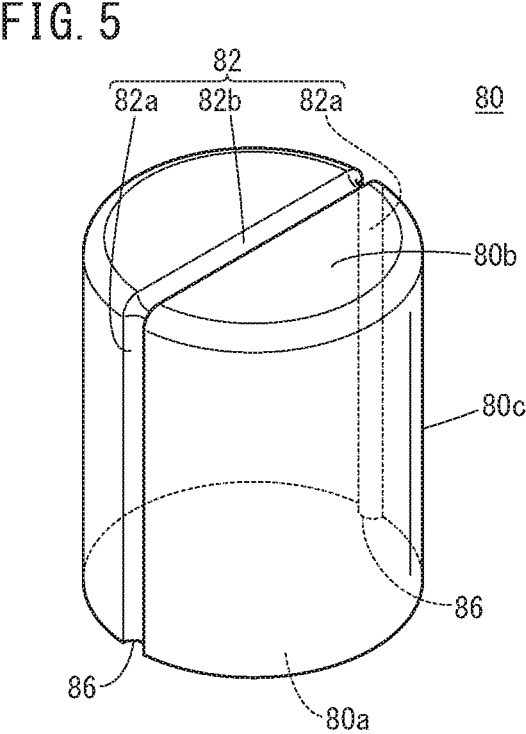
FIG. 5 is a perspective view of the plug according to a modification.

The high pressure tank 10 according to the embodiment may include a plug 80 according to a modification shown in FIG. 5 instead of the plug 56. As shown in FIGS. 2 and 5, this plug 80 employs the same configuration as that of the plug 56 except that, instead of the plug passage 58, a groove passage 82 is formed in a surface, and is inserted in the insertion hole 50. That is, the plug 80 includes one end surface 80*a* that faces toward the outer surface of the dented portion 20, another end surface 80*b* that is in contact with the step surface 54, and a side surface 80*c* that faces toward the inner surface of the insertion hole 50.

The groove passage 82 is formed by a pair of first groove passages 82*a* that are formed in the side surface 80*c* extending along the axial direction of the plug 80, and a second groove passage 82*b* that is formed in the other end surface 80*b* extending along a diametrical direction of the plug 80.

The pair of first groove passages 82*a* are disposed at both ends in the diametrical direction of the plug 80, and have a semicircular cross-sectional shape. Hence, first openings 86 on the one ends of the first groove passages 82*a* are formed into semicircles at both ends in the diametrical direction of the one end surface 80*a* of the plug 80. The area of the first opening 86 and the cross-sectional area of the first groove passage 82*a* are set smaller than the cross-sectional area of the cap passage 52. The second groove passage 82*b* communicates the other end sides of the pair of first groove passages 82*a*, and communicates the other ends of the first groove passages 82*a* to the cap passage 52.

That is, the first groove passages 82a form the one end of the gas vent passage 64, and the cap passage 52 forms the other end of the gas vent passage 64. This gas vent passage 64 can guide the hydrogen gas having been guided into the first groove passages 82a via the two first openings 86 to the cap passage 52 via the second groove passage 82b, and discharge the hydrogen gas from the second opening 62 into the supply/discharge hole 32.

For the same reason as in the plug passage 58 easily formed in the plug 56, the groove passage 82 can also be easily formed in the plug 80. Consequently, it is possible to easily form the gas vent passage 64 having one end with the small cross-sectional area.

As described above, the cross-sectional area of the one end (groove passage 82) of the gas vent passage 64 formed by the groove passage 82 and the cap passage 52, and the area of the first opening 86 are also smaller than the cross-sectional area of the other portion (cap passage 52). Consequently, even when the high pressure tank 10 includes the gas vent passage 64 formed by the groove passage 82 and the cap passage 52, it is possible to obtain the same function and effect as the configuration including the gas vent passages 64 formed by the plug passage 58 and the cap passage 52.

Even in the case where the first opening 86 has the semicircular shape, the area of the first opening 86 is preferably set such that the maximum shear stress generated at the portion 14a of the liner 14 facing toward the first opening 86 is equal to or less than ½ of the yield stress S of the resin material. When the first opening 86 has the semicircular shape, a circumferential length of the first opening 86 may be set to the same as or smaller than the circumference of the first opening 60 of the circular shape.

Figure 6:
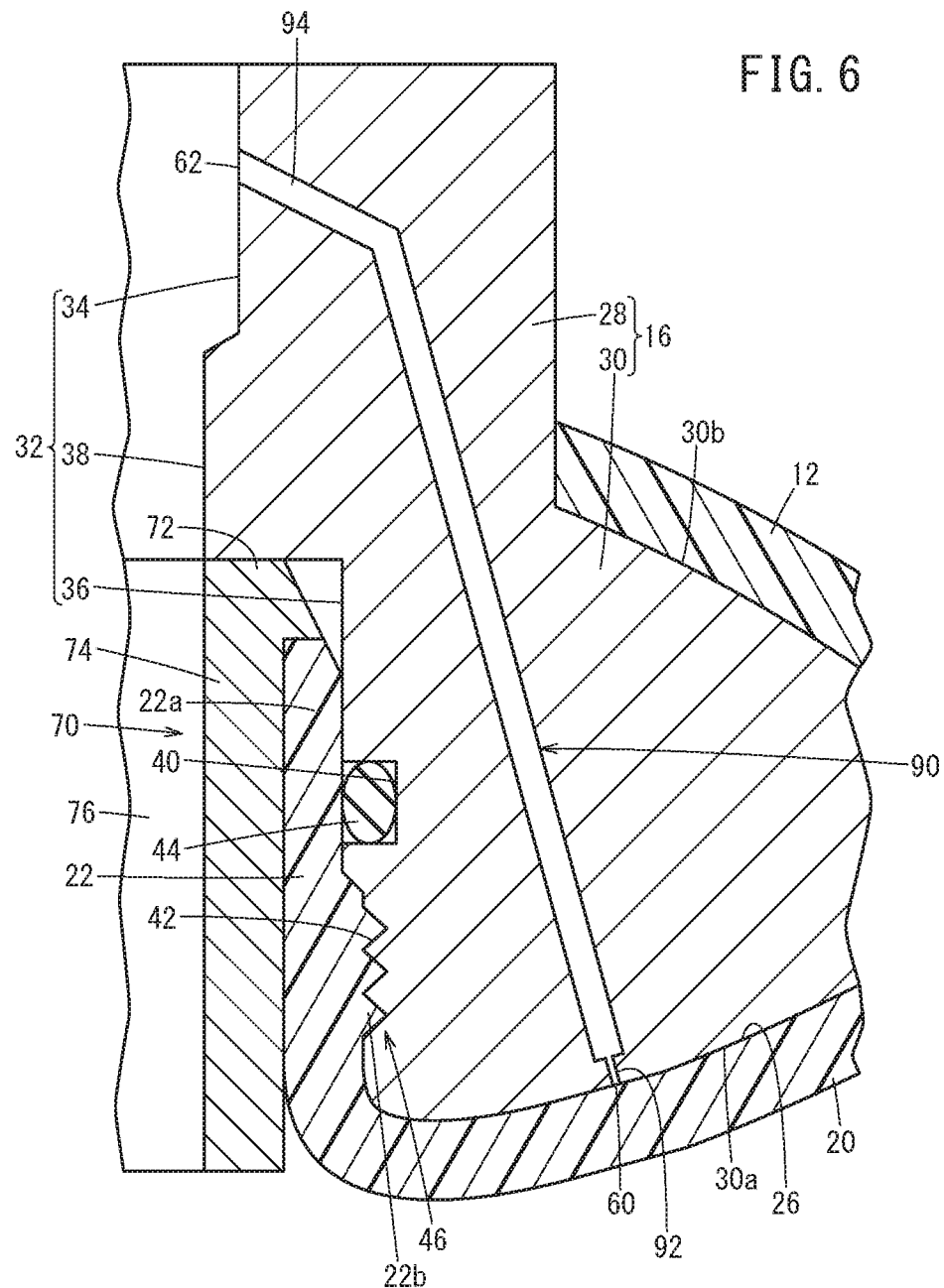
FIG. 6 is an enlarged cross-sectional view of the cap side of the high pressure tank according to another embodiment.

The high pressure tank 10 according to the embodiment includes the plugs 56, 80, and the plugs 56, 80 form the one ends of the gas vent passages 64. However, the high pressure tank 10 is not limited to this. For example, as shown in FIG. 6, the high pressure tank 10 may not include the plugs 56, 80, and may include gas vent passages 90 directly and integrally formed with the cap 16. That is, a cross-sectional area at one end 92 and the area of the first opening 60 of this gas vent passage 90 are smaller than cross-sectional areas of another portion 94. Even in the case where the high pressure tank 10 includes the gas vent passages 90, the high pressure tank 10 can provide the function and effect same as those of the high pressure tank 10 including the gas vent passage 64. Components shown in FIG. 6 and having the same or similar functions and effects as those in FIG. 2 will be assigned with the same reference numerals, and will not be described in detail.

In the high pressure tank 10 according to the embodiment, the second opening 62 is formed in the inner circumferential surface of the medium inner diameter hole 34 yet is not limited to these in particular. The second opening 62 can be formed anywhere as long as the hydrogen gas between the reinforced-layer-facing surface 24 of the liner 14 and the reinforced layer 12 can be guided to the outside of the reinforced layer 12. For example, the second opening 62 may be formed in the outer circumferential surface or the protrusion end surface of the protrusion portion 28 which is exposed from the opening of the reinforced layer 12. Further, the second openings 62 may be formed in the inner circumferential surface of the supply/discharge hole 32 at a location other than the medium inner diameter hole 34.

In the embodiment, the other portion of the gas vent passage 64 such as the cap passage 52 is one passage, yet is not limited to this in particular and may be branched into a plurality of passages. In this case, the second opening 62 is also provided in plural at the other end of the gas vent passage 64. The plug passage 58 may be provided with a plurality of small diameter passages 58a.

In the embodiment, the shapes of the first opening 60 and the second opening 62, and the cross-sectional shapes of the plug passage 58, the cap passage 52 and the gas vent passage 90 are respectively circular, and the shapes of the first opening 86 and the cross-sectional shape of the groove passage 82 are semicircular. However, these shapes are not limited to these in particular, and may have various shapes such as polygonal shapes and elliptical shapes.

What is claimed is:

1. A high pressure tank comprising:
   a resin liner configured to contain a fluid;
   a reinforced layer covering an outer surface of the liner; and
   a cap including a supply/discharge hole configured to supply and discharge the fluid to and from the liner, wherein:
   the outer surface of the liner includes a reinforced-layer-facing surface facing toward the reinforced layer and a cap-facing surface facing toward the cap;
   a gas vent passage is formed in the cap, the gas vent passage having at one end a first opening facing toward the cap-facing surface and at another end a second opening facing toward at least one of an inside of the supply/discharge hole and an outside of the reinforced layer;
   a cross-sectional area of the gas vent passage at one end perpendicular to its longitudinal direction and an opening area of the first opening are smaller than a cross-sectional area of the gas vent passage at another portion perpendicular to the longitudinal direction; and
   a plug inserted in an insertion hole formed in the cap to open toward the cap-facing surface, wherein:
   a plug passage penetrating the plug at least partially forms the one end of the gas vent passage, and a cap passage formed in the cap forms the other end of the gas vent passage; and
   the first opening is formed in an end surface at one end of the plug facing toward the cap-facing surface.

2. The high pressure tank according to claim 1, wherein the area of the first opening is set such that a maximum shear stress generated at a portion of the liner facing toward the first opening is equal to or less than ½ of a yield stress S of a resin material constituting the liner.

3. The high pressure tank according to claim 2, wherein the first opening has a circular shape with a diameter D, and the diameter D meets a following inequality: $D < S \times T \times 2/P$, where T represents a thickness T of the portion of the liner facing toward the first opening, P represents a maximum filling pressure P of the fluid, and S represents the yield stress S of the resin material.

4. The high pressure tank according to claim 1, wherein the plug and the cap are formed of a same material.

5. A high pressure tank comprising:
   a resin liner configured to contain a fluid;
   a reinforced layer covering an outer surface of the liner; and
   a cap including a supply/discharge hole configured to supply and discharge the fluid to and from the liner, wherein:
   the outer surface of the liner includes a reinforced-layer-facing surface facing toward the reinforced layer and a cap-facing surface facing toward the cap;

a gas vent passage is formed in the cap, the gas vent passage having at one end a first opening facing toward the cap-facing surface and at another end a second opening facing toward at least one of an inside of the supply/discharge hole and an outside of the reinforced layer;

a plug inserted in an insertion hole formed in the cap to open toward the cap-facing surface; and a cross-sectional area of the gas vent passage at one end perpendicular to its longitudinal direction and an opening area of the first opening are smaller than a cross-sectional area of the gas vent passage at another portion perpendicular to the longitudinal direction, wherein:

a groove passage formed on a surface of the plug at least partially forms the one end of the gas vent passage, and a cap passage formed in the cap forms the other end of the gas vent passage; and the first opening is formed in an end surface at the one end of the plug facing toward the cap-facing surface.

6. The high pressure tank according to claim 5, wherein the area of the first opening is set such that a maximum shear stress generated at a portion of the liner facing toward the first opening is equal to or less than ½ of a yield stress S of a resin material constituting the liner.

7. The high pressure tank according to claim 6, wherein the first opening has a circular shape with a diameter D, and the diameter D meets a following inequality: $D < S \times T \times 2/P$, where T represents a thickness T of the portion of the liner facing toward the first opening, P represents a maximum filling pressure P of the fluid, and S represents the yield stress S of the resin material.

8. The high pressure tank according to claim 5, wherein the plug and the cap are formed of a same material.

* * * * *